US011159564B2

(12) United States Patent
Nandi

(10) Patent No.: US 11,159,564 B2
(45) Date of Patent: Oct. 26, 2021

(54) DETECTING ZERO-DAY ATTACKS WITH UNKNOWN SIGNATURES VIA MINING CORRELATION IN BEHAVIORAL CHANGE OF ENTITIES OVER TIME

(71) Applicant: Google LLC, Mountain View, CA (US)

(72) Inventor: Animesh Nandi, Mountain View, CA (US)

(73) Assignee: Google LLC, Mountain View, CA (US)

( * ) Notice: Subject to any disclaimer, the term of this patent is extended or adjusted under 35 U.S.C. 154(b) by 188 days.

(21) Appl. No.: 16/464,779

(22) PCT Filed: Jun. 28, 2018

(86) PCT No.: PCT/US2018/039986
§ 371 (c)(1),
(2) Date: May 29, 2019

(87) PCT Pub. No.: WO2020/005250
PCT Pub. Date: Jan. 2, 2020

(65) Prior Publication Data
US 2020/0145455 A1 May 7, 2020

(51) Int. Cl.
*G06F 21/00* (2013.01)
*H04L 29/06* (2006.01)
(52) U.S. Cl.
CPC ...... *H04L 63/1466* (2013.01); *H04L 63/1416* (2013.01)
(58) Field of Classification Search
CPC .............. H04L 63/1466; H04L 63/1416; H04L 63/1458; G06F 21/577; G06F 21/566; H04W 12/12
See application file for complete search history.

(56) References Cited

U.S. PATENT DOCUMENTS 7,032,114 B1  4/2006  Moran
8,887,286 B2  11/2014 Dupont et al.
(Continued)

FOREIGN PATENT DOCUMENTS

WO  2016123522 A1  8/2016

OTHER PUBLICATIONS

Ahmed AlEroud, George Karabatis, "A Contextual Anomaly Detection Approach to Discover Zero-Day Attacks", IEEE (2012) 6 pgs.
(Continued)

*Primary Examiner* — Lisa C Lewis
(74) *Attorney, Agent, or Firm* — Lerner, David, Littenberg, Krumholz & Mentlik, LLP

(57) ABSTRACT

Zero-day attacks with unknown attack signatures are detected by correlating behavior differences of a plurality of entities. An entity baseline behavior for each entity of the plurality of entities is determined 310, the entity baseline behavior includes multiple variables. An entity behavior difference for each entity is determined at a series of points in time 320. Correlations between the entity behavior differences for the plurality of entities are determined at the series of points in time 330. Based on these correlations, it is determined whether the plurality of entities is exhibiting coordinated behavior differences 340. An attack signature is determined based on the entity behavior differences and the correlations 350. A database of attack signatures is generated 360.

20 Claims, 9 Drawing Sheets

(56) References Cited

U.S. PATENT DOCUMENTS

| | | | |
|---|---|---|---|
| 9,807,104 B1* | 10/2017 | Sarra | H04L 63/102 |
| 9,998,484 B1* | 6/2018 | Buyukkayhan | G06F 16/285 |
| 2003/0188189 A1* | 10/2003 | Desai | H04L 63/104 |
| | | | 726/23 |
| 2008/0034424 A1 | 2/2008 | Overcash et al. | |
| 2014/0283062 A1* | 9/2014 | Kamthe | H04W 12/122 |
| | | | 726/23 |
| 2015/0288715 A1 | 10/2015 | Hotchkiss | |
| 2016/0330219 A1 | 11/2016 | Hasan | |
| 2018/0176241 A1* | 6/2018 | Manadhata | H04L 63/1425 |
| 2018/0191746 A1* | 7/2018 | De Knijf | H04L 63/102 |
| 2019/0141060 A1* | 5/2019 | Lim | H04L 63/20 |

OTHER PUBLICATIONS

International Search Report and Written Opinion for PCT Application No. PCT/US2018/039986, dated Oct. 5, 2018. 14 pages.
Kathleen Goeschel, "Reducing False Positives in Intrusion Detection Systems Using Data-Mining Techniques Utilizing Support Vector Machines, Decision Trees, and Naive Bayes for Off-Line Analysis", IEEE (2016) 6 pgs.
Nenad Stojanovic, et al., "A Data-Driven Approach for Multivariate Contextualized Anomaly Detection: Industry Use Case", IEEE (2017) 10 pgs.
Sai C. Pallaprolu, et al., "Zero-Day Attack Identification in Streaming Data Using Semantics and Spark", IEEE (2017) 8 pgs.
Sheng-Hui Chien, et al., "Attack Subplan-Based Attack Scenario Correlation", IEEE (2007) 7 pgs.
International Preliminary Report on Patentability for PCT Application No. PCT/US2018/039986, dated Jan. 7, 2021. 8 pages.

* cited by examiner

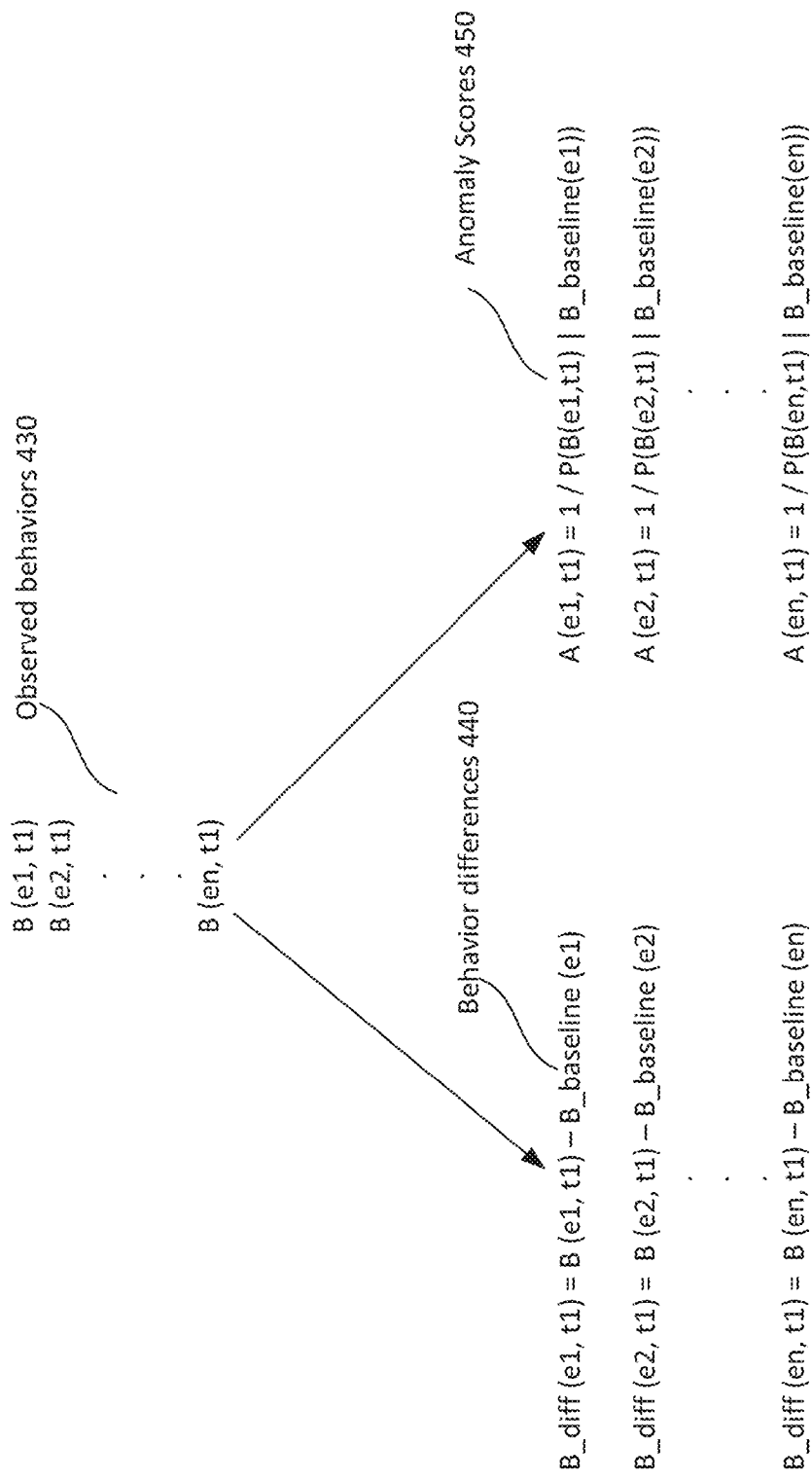

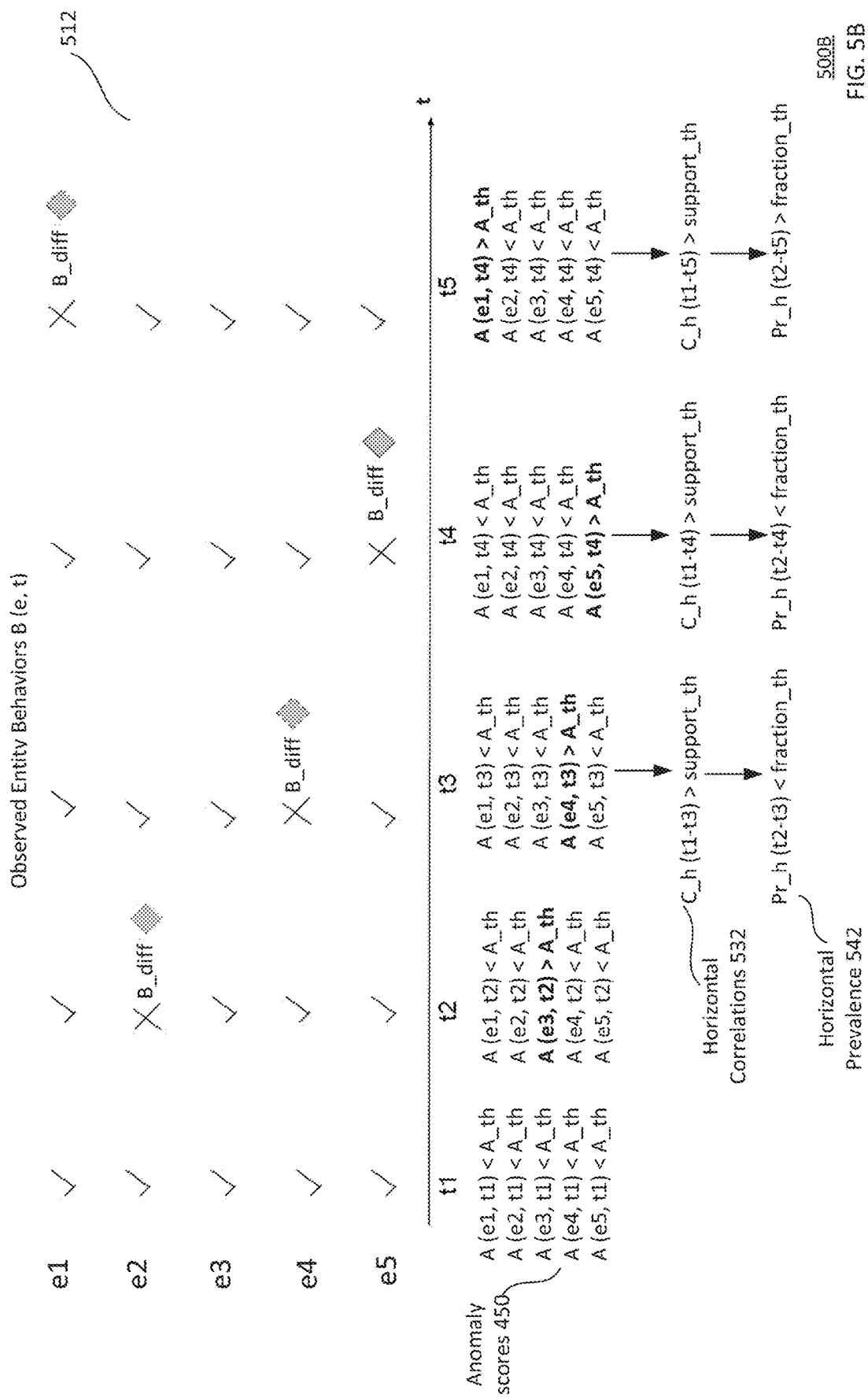

DETECTING ZERO-DAY ATTACKS WITH UNKNOWN SIGNATURES VIA MINING CORRELATION IN BEHAVIORAL CHANGE OF ENTITIES OVER TIME

CROSS-REFERENCE TO RELATED APPLICATION

This application is a national phase entry under 35 U.S.C. § 371 of International Application No. PCT/US2018/039986, filed Jun. 28, 2018, the entire disclosure of which is incorporated herein by reference.

BACKGROUND

Attack signatures are unique information that can be used to identify attempts to exploit a known security vulnerability. When the attack signature of a security attack is known, supervised techniques can be used to detect whether an entity is under attack by identifying whether the entity's behavior exhibits features of the attack signature. In contrast, because zero-day attacks are new exploits of previously unknown security vulnerabilities (attack signatures are yet unknown), supervised techniques cannot be used.

BRIEF SUMMARY

The present disclosure provides for determining, using one or more processors, an entity baseline behavior for each entity of a plurality of entities, wherein the entity baseline behavior for each of the plurality of entities includes multiple variables; determining, using the one or more processors, an entity behavior difference for each entity of the plurality of entities at a series of points in time; evaluating, using the one or more processors, one or more correlations between the entity behavior differences for the plurality of entities at the series of points in time; determining, using the one or more processors, whether the plurality of entities is exhibiting coordinated behavior differences based on the one or more correlations; determining, using the one or more processors, an attack signature based on the entity behavior differences and the one or more correlations; and generating, using the one or more processors, a database of attack signatures.

The method may further comprise determining whether the attack signature is a false positive, wherein each of the attack signatures in the database includes an indication of whether the attack signature is a false positive.

The method may further comprise computing, using the one or more processors, an entity anomaly score for each entity of the plurality of entities at the series of points in time; wherein the one or more correlations are evaluated for entities having entity anomaly scores above a predetermined anomaly threshold and whether the plurality of entities is exhibiting coordinated behavior differences is determined based on the one or more correlations evaluated for the entities having entity anomaly scores above the predetermined anomaly threshold. The method may further comprise generating an alert when the entity anomaly score is above the predetermined anomaly threshold. The entity anomaly score for each entity may be computed based on a divergence value of an observed current behavior of the entity compared to past behaviors of the entity over a past time period. Alternatively, the entity anomaly score for each entity is computed based on a divergence value between an observed current behavior of the entity compared to a predicted current behavior of the entity.

The one or more correlations may be vertical correlations evaluated for the plurality of entities at a same point in time of the series of points in time. Alternatively or additionally, the one or more correlations may be horizontal correlations evaluated for the plurality of entities across different points in time of the series of points in time.

Determining whether the plurality of entities is exhibiting coordinated behavior differences may be based on whether the one or more correlations are above a predetermined support threshold.

Each of the entities in the plurality of entities may belong to a predetermined group, and determining whether the predetermined group is exhibiting coordinated behavior differences may be based on whether the entity behavior differences for a threshold fraction of entities of the predetermined group have correlations above a predetermined support threshold. The method may further comprise generating, using the one or more processors, an alert when the predetermined group is determined to be exhibiting coordinated behavior differences. At least one entity of the plurality of entities may belong to more than one predetermined groups.

The method may further comprise determining, using the one or more processors, which entities of the plurality of entities belong to a particular group based on which entities have correlations above a predetermined clustering similarity threshold; and determining whether the particular group is exhibiting coordinated behavior differences based on whether a number of entities in the particular group is above a predetermined threshold number. The method may further comprise identifying a largest common attribute amongst the entities in the particular group; and determining an attack channel of the particular group based on the largest common attribute.

The entities may comprise at least one of: user computing devices, virtual machines, cloud service users, online service users, or application programming interface (API) users.

The disclosure further provides for a computing system comprising one or more processors configured to determine an entity baseline behavior for each entity of a plurality of entities, wherein the entity baseline behavior for each of the plurality of entities includes multiple variables; determine an entity behavior difference for each entity of the plurality of entities at a series of points in time; evaluate one or more correlations between the entity behavior differences for the plurality of entities at the series of points in time; determine whether the plurality of entities is exhibiting coordinated behavior differences based on the one or more correlations; determine an attack signature based on the entity behavior differences and the one or more correlations; and generate a database of attack signatures.

The one or more processors may be further configured to generate an alert when a predetermined group is determined to be exhibiting coordinated behavior differences, wherein each of the entities in the plurality of entities belongs to the predetermined group, and determining whether the predetermined group is exhibiting coordinated behavior differences is based on whether the entity behavior differences for a threshold fraction of entities of the predetermined group have correlations above a predetermined support threshold.

The computing system may further comprise one or more memories in communication with the one or more processors, the one or more memories configured to store the database of attack signatures.

The disclosure yet further provides for a system comprising a computing device adapted to communicate with a plurality of computing devices in a distributed computing environment, the computing device comprising one or more processors configured to receive an entity behavior difference for each entity of a plurality of entities at each point of a series of points in time, wherein one or more of the plurality of entities belong to more than one predetermined groups; emit, for each entity, the received entity behavior difference for the predetermined groups that the entity belongs to; reduce the emitted entity behavior differences into sets according to the predetermined group; evaluate, for each set of entity behavior differences, one or more correlations between the entity behavior differences at the series of points in time; determine whether any set of entity behavior differences are exhibiting coordinated behavior differences based on the one or more correlations; determine an attack signature based on the entity behavior differences and the one or more correlations; and generate a database of attack signatures.

The one or more processors may be further configured to compute an entity anomaly score for each entity of the plurality of entities at the series of points in time; wherein the one or more correlations are evaluated for entities having entity anomaly scores above a predetermined anomaly threshold and whether the plurality of entities is exhibiting coordinated behavior differences is determined based on the one or more correlations evaluated for the entities having entity anomaly scores above the predetermined anomaly threshold.

BRIEF DESCRIPTION OF THE DRAWINGS

FIG. 4B illustrates example anomaly scores according to aspects of the disclosure.

FIGS. 5A and 5B illustrate example correlations of behavior differences according to aspects of the disclosure.

DETAILED DESCRIPTION

Overview

Figure 1:
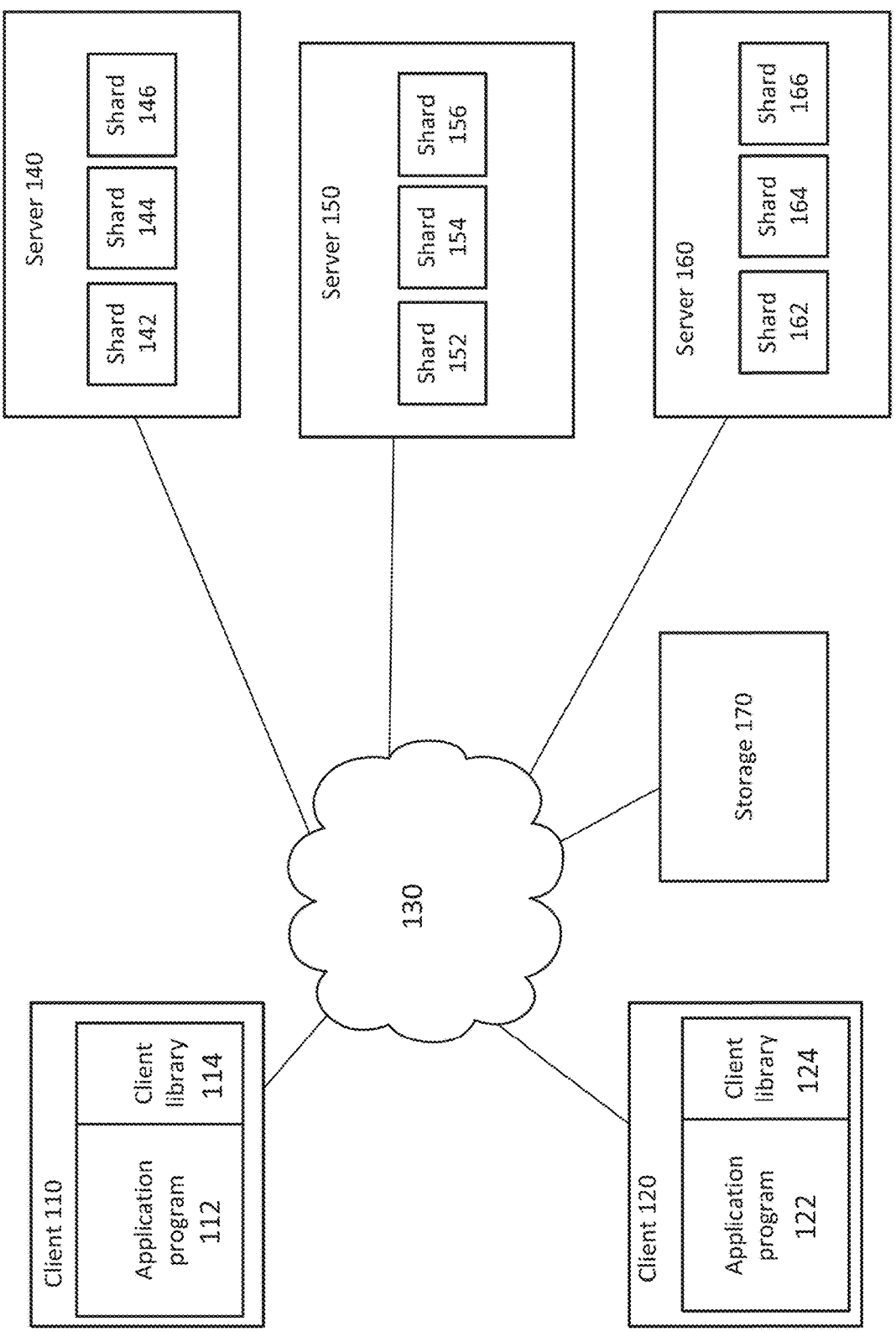
FIG. 1 is a block diagram illustrating an example system according to aspects of the disclosure.

The disclosure generally relates to detecting zero-day attacks on computing systems, for example, by correlating behavior differences of a plurality of entities. Because zero-day attacks are new exploits of previously unknown security vulnerabilities (attack signatures unknown), a fundamental challenge is to differentiate whether an entity's behavioral fluctuations are benign or caused by a malicious attack. In this regard, two modules may be used. In the first module, behavior differences are determined for each individual entity with respect to their respective baseline behavior. In the second module, behavior differences are correlated for multiple entities to determine whether the behavior differences exhibit sufficient similarities and whether any sufficiently similar behavior differences are prevalent enough to indicate that an attack is occurring.

In the first module, an entity baseline behavior is first determined for each entity. For instance, the entity baseline behavior may be determined based on a past time-series of behavioral features of the entity and may include multiple variables. Then, in real time, for each time point, an entity behavior difference is determined for each entity by comparing the entity's observed behavior with the entity's baseline behavior. This individualized approach is taken because each entity may have very different baseline behaviors, thus, behavior differences computed over some average baseline would make little sense, and may result in a large number of false positives. An anomaly score may be determined along with the entity behavior difference. In some examples, the correlations in the second module are performed only for entity behavior differences whose anomaly scores are above a predetermined threshold anomaly score. This way, false positives may be reduced since only substantial behavior differences are correlated.

In the second module, behavior differences are correlated for multiple entities to determine whether the behavior differences exhibit sufficient similarities and whether any sufficiently similar behavior differences are also sufficiently prevalent to indicate that an attack is occurring. This aggregated approach is taken because producing security alerts on a per-entity basis could result in an unmanageable amount of alerts, most of which are likely false positives. For example, any entity may do a rare activity occasionally even when not under any attack, such a rare activity may cause a fluctuation from that entity's baseline behavior, but may exhibit very little similarity with rare activities conducted by other entities. In contrast, an attacker is more likely to target multiple entities in a similar fashion to reach a common goal, such as retrieving contact information from multiple accounts for phishing, retrieving passwords from multiple accounts, creating virtual machines using multiple entities to conduct a specific activity, etc. Further, an aggregated approach for producing alerts could offer greater privacy protection to individual entities.

For entities that are known to belong to a predetermined group that may be targeted by a potential attacker, the entity behavior differences are correlated between multiple entities in the predetermined group to determine whether any of the entity behavior differences exhibit sufficient similarities, and if so, whether such sufficiently similar entity behavior differences are also sufficiently prevalent to indicate that an attack is occurring. For instance, a predetermined support threshold may be set such that, if a correlation indicates that the entity behavior differences are above this predetermined support threshold, the entity behavior differences are determined to be sufficiently similar. For another instance, a predetermined threshold fraction may be set such that, if the fraction of entity behavior differences determined to be sufficiently similar are above this predetermined threshold fraction, the correlations are determined to be sufficiently prevalent to indicate an attack.

In some examples, the entity behavior differences are correlated between multiple entities in the predetermined group at each point in time ("vertical correlation") to determine whether an attack is occurring at that point in time. In other examples, the entity behavior differences are correlated between multiple entities in a predetermined group across multiple points in time ("horizontal correlation"). Such horizontal correlations may be used to detect more sophisticated attacks where the coordinated attack is intentionally spread out over a longer duration in time in order to avoid detection.

If there is no predetermined group (it is unknown whether any of the plurality of entities belong to a group that may be targeted for a potential attack), the behavior differences may be correlated between all the entities to identify clusters that exhibit sufficiently similar behavior differences. For instance, the cluster may be determined based on a predetermined clustering similarity threshold. Because there is no predetermined group, whether the sufficiently similar behavior differences are sufficiently prevalent to indicate an attack cannot be based on a predetermined threshold fraction of any predetermined group. Rather, whether an attack is occurring may be determined based on a predetermined threshold number of entities in the identified cluster. Further, an attack channel may be determined by computing a largest common attribute amongst the entities in the potential cluster to help identifying other vulnerable entities not currently in the cluster.

Additionally, an attack signature may be determined based on the entity behavior differences and the correlations. In this regard, the significant behavior differences that are sufficiently similar and prevalent may include the attack signature. Over time, a database of attack signatures may be built based on the determined attack signatures. Analyses may be performed to further classify the determined attack signatures as true attacks or false positives. The database may include indications of whether each of the attack signatures is a true attack or a false positive. The database may help further reducing false-positives, for instance, attack signature of a newly observed attack may be compared with the attack signatures already in the database. If an entry in the database matches the newly observed attack signature, the newly observed attack may adopt the classification in the database. If no entry is found in the database, the newly observed attack signature may be tagged or sent to an analyst for manual review.

The above-described techniques for detecting zero-day attacks are advantageous because they combine individualized approaches together with aggregated approaches to accurately detect zero-day attacks. The individualized approach for determining behavior differences over individualized baseline behaviors reduces false positives based on some average baseline that makes little sense. The aggregated approach for correlating behavior differences of multiple entities reduces false positives due to rare individual behaviors. The aggregated approach may include vertical and horizontal correlations to better detect coordinated attacks. These techniques also provide for determining attack signatures and attack channels, which further helps in preventing targeted attacks. The technology is applicable for many types of entities, for example, user computing devices, virtual machines, cloud service users, online service users, or application programming interface (API) users.

Example Systems

FIG. 1 illustrates an example distributed system 100 for detecting zero-day attacks. A plurality of computing devices, such as servers 140, 150, 160, may communicate with each other, for example, over a network 130. The servers 140, 150, 160 may further communicate with a plurality of client computing devices, such as clients 110, 120. For example, behavior data may be collected for billions of entities that belong to millions of predetermined groups from computing devices such as clients 110 and 120. Behavior data may be collected for millions of entities in a predetermined group, and since behavior data for an entity may include many behavior features or variables, behavior data for the millions of entities may be tens or hundreds of TBs in size. The behavior data may be sharded into thousands or tens of thousands of shards, such as shards 142, 152, 162 stored in the distributed system. Correlations performed on behavior data of such a large number of entities and predetermined groups could produce results that are several TBs in size. Correlation results and other computation results may also be stored in shards, such as shards 144, 146, 154, 156, 164, and 166.

Correlations performed on multiple shards of the behavior data may be performed in a distributed manner, for example, as smaller jobs involving smaller subsets of data distributed to multiple computing devices. For instance, for the billions of entities in millions of predetermined groups, the correlations of the behavior data could be performed using thousands of computing devices. In this regard, one or more computing devices or servers in the distributed system, such as servers 140, 150, 160, may be configured to create the smaller jobs involving smaller subsets of data and distribute the smaller jobs to other computing devices in the distributed system, for example, using the example methods described in detail below. These one or more servers may also be configured to receive and process the smaller jobs distributed to them, for example, using the example methods described in detail below.

Each server 140, 150, 160, may store and execute actions for multiple shards of behavior data. The distributed system may implement a protocol, such as Paxos, to provide consensus across the system. While only a few servers, clients, and shards are shown, any number of servers may be included in the distributed system, each of which may store multiple shards.

Each of clients 110, 120 is shown as having an application program 112, 122 and a client library 114, 124, though it should be understood that additional features of client devices may also be present. The client devices may be user devices, or servers providing service to user devices. Either of the clients 110, 120 may send behavior data to the distributed system by sending data over the network 130 to one of the servers 140, 150, 160. While only a few clients are shown, it should be understood that a vast number of client devices may communicate with the distributed system over the network 130.

The servers 140, 150, 160 may be positioned a considerable distance from one another. For example, the servers may be positioned in various countries around the world. Each server 140, 150, 160 may include a number of storage devices, such as hard drives, random access memory, disks, disk arrays, tape drives, or any other types of storage devices. The servers 140, 150, 160 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. The servers may include a number of other devices in addition to the storage devices, such as cabling, routers, etc. The servers 140, 150, 160 may be virtualized environments.

The distributed system may further include a storage system 170, which may also store information that can be accessed by the servers 140, 150, 160. The storage system 170 may store information that can be accessed over the network 130. The storage system can include any non-transitory type capable of storing information accessible by the processor, such as a hard-drive, memory card, ROM, RAM, DVD, CD-ROM, write-capable, and read-only memories. For example, a database of attack signatures determined using the methods described in detail below may be stored in the storage system 170.

Figure 2:
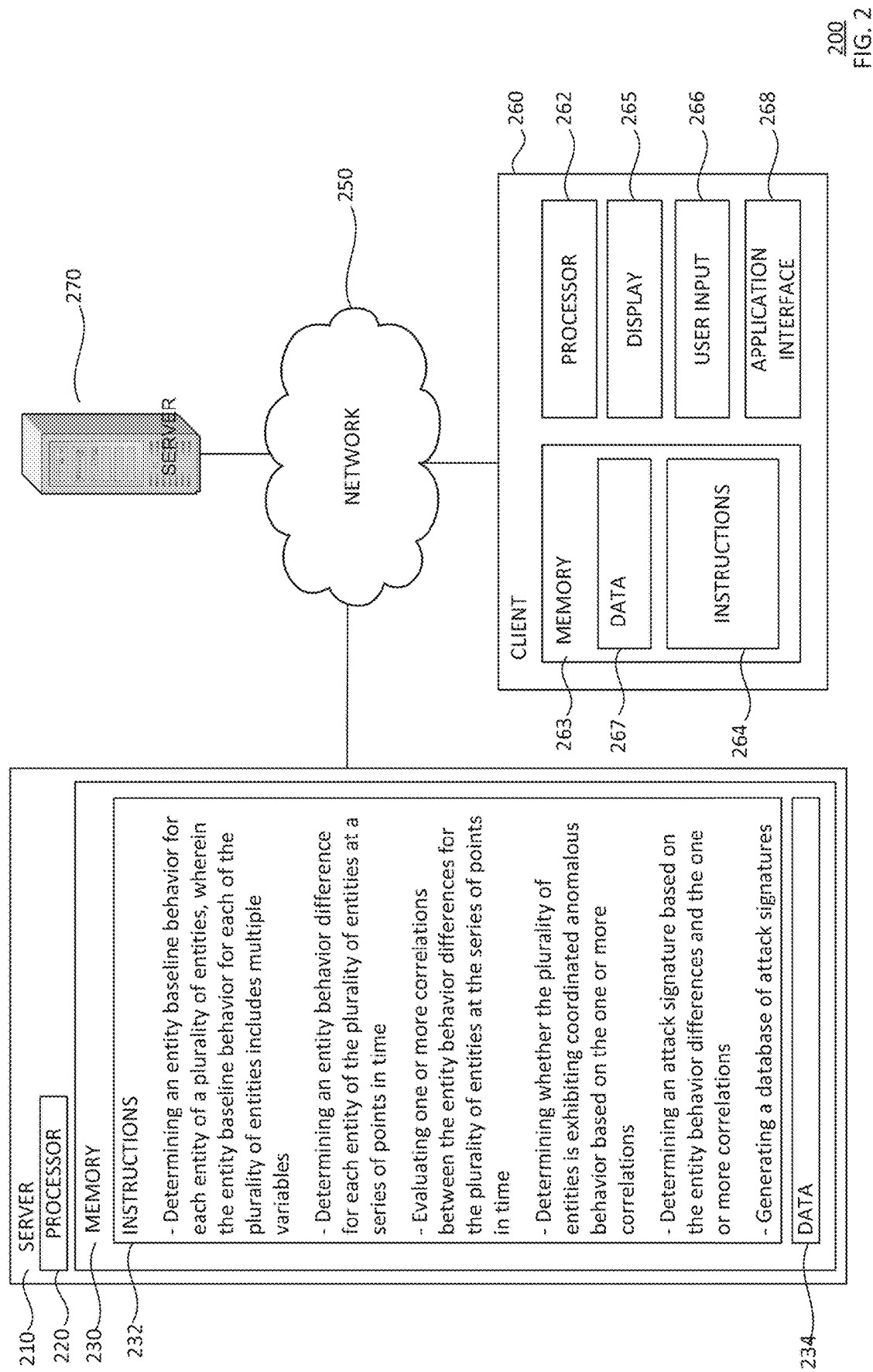
FIG. 2 is a block diagram illustrating another example of the system of FIG. 1 according to aspects of the disclosure.

FIG. 2 is a diagram of an example distributed system for detecting zero-day attacks. As shown, an example system 200 may include a number of servers 210 and 270 coupled to a network 250. Each of the servers 140, 150, 160 of FIG. 1 may be configured as server 210 of FIG. 2. The system may also include a client 260 capable of communication with the servers 210 and 270 over the network 250.

The server 210 may contain a processor 220, memory 230, and other components typically present in general purpose computers. The memory 230 can store information accessible by the processor 220, including instructions 232 that can be executed by the processor 220. Memory can also include data 234 that can be retrieved, manipulated or stored by the processor 220. The memory 230 may be a type of non-transitory computer readable medium capable of storing information accessible by the processor 220, such as a hard-drive, solid state drive, tape drive, optical storage, memory card, ROM, RAM, DVD, CD-ROM, write-capable, and read-only memories. The processor 220 can be a well-known processor or other lesser-known types of processors. Alternatively, the processor 220 can be a dedicated controller such as an ASIC.

The instructions 232 can be a set of instructions executed directly, such as computing device code, or indirectly, such as scripts, by the processor 220. In this regard, the terms "instructions," "steps" and "programs" can be used interchangeably herein. The instructions 232 can be stored in object code format for direct processing by the processor 220, or other types of computer language including scripts or collections of independent source code modules that are interpreted on demand or compiled in advance. Functions, methods, and routines of the instructions are explained in more detail in the foregoing examples and the example methods below. The instructions 232 may include any of the example features described herein. For instance, the instructions 232 may include the flowchart of FIG. 3. For example the instructions 232 may include determining entity baseline behaviors, determining entity behavior differences, computing anomaly scores, evaluating correlations between the entity behavior differences, determining whether entities are exhibiting coordinated behavior differences, and determining attack signatures.

The data 234 can be retrieved, stored or modified by the processor 220 in accordance with the instructions 232. For instance, although the system and method is not limited by a particular data structure, the data 234 can be stored in computer registers, in a relational database as a table having a plurality of different fields and records, or XML documents. The data 234 can also be formatted in a computer-readable format such as, but not limited to, binary values, ASCII or Unicode. Moreover, the data 234 can include information sufficient to identify relevant information, such as numbers, descriptive text, proprietary codes, pointers, references to data stored in other memories, including other network locations, or information that is used by a function to calculate relevant data. The data 234 may store behavior data of various entities. The data 234 may also store baseline behaviors, behavior differences, anomaly scores, correlation results, and attack signatures.

Although FIG. 2 functionally illustrates the processor 220 and memory 230 as being within the same block, the processor 220 and memory 230 may actually include multiple processors and memories that may or may not be stored within the same physical housing. For example, some of the instructions 232 and data 234 can be stored on a removable CD-ROM and others within a read-only computer chip. Some or all of the instructions and data can be stored in a location physically remote from, yet still accessible by, the processor 220. Similarly, the processor 220 can actually include a collection of processors, which may or may not operate in parallel.

Servers 210 and 270 may be at one node of network 250 and capable of directly and indirectly communicating with other nodes of the network 250. For example, the servers 210 and 270 can include a web server that may be capable of communicating with client 260 via network 250 such that it uses the network 250 to transmit information to a client application. Servers 210 and 270 may also include a number of computers, for instance, a load balanced server farm, that exchange information with different nodes of the network 250 for the purpose of receiving, processing and transmitting data to client devices. In this instance, the client computers will typically be at different nodes of the network 250 than the computers making up servers 210 and 270. Although only a few servers 210, 270 are depicted in FIG. 2, it should be appreciated that a typical system can include a large number of connected servers with each being at a different node of the network 250.

Each client 260 may be configured, similarly to servers 210 and 270, with a processor 262, memory 263, instructions 264, and data 267. Each client 260 may be a personal computer, intended for use by a person having all the internal components normally found in a personal computer such as a central processing unit (CPU), CD-ROM, hard drive, and a display device 265, for example, a monitor having a screen, a projector, a touch-screen, a small LCD screen, a television, or another device such as an electrical device that can be operable to display information processed by the processor 262, speakers, a modem and/or network interface device, user input component 266, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 260 may include an application interface module 268. The application interface module may be used to access a service made available by a server, such as servers 210 and 270. The application interface module may include sub-routines, data structures, object classes and other type of software components used to allow servers and clients to communicate with each other. In one aspect, the application interface module 268 may be a software module operable in conjunction with several types of operating systems known in the arts. Memory 263 coupled to a client 260 may store data 267 accessed by the application interface module 268. The data 267 can also be stored on a removable medium such as a disk, tape, SD Card or CD-ROM, which can be connected to client 260.

Servers 210 and 270 and client 260 can be capable of direct and indirect communication such as over network 250. For example, using an Internet socket, a client 260 can connect to a service operating on remote servers 210 and 270 through an Internet protocol suite. Servers 210 and 270 can set up listening sockets that may accept an initiating connection for sending and receiving information. The network 250, and intervening nodes, may include various configurations and protocols including the Internet, World Wide Web, intranets, virtual private networks, wide area networks, local networks, private networks using communication protocols proprietary to one or more companies, Ethernet, WiFi (for instance, 802.81, 802.81b, g, n, or other such standards), and HTTP, and various combinations of the foregoing. Such communication may be facilitated by a device capable of transmitting data to and from other computers, such as modems (for instance, dial-up, cable or fiber optic) and wireless interfaces.

Although FIG. 2 shows server 210 and client 260 as individual blocks, each of which contains its own processor and memory, the operations described herein may involve a single computing device or many computing devices, for instance, in the "cloud." For example, various operations described herein as involving a single computing device (for instance, a single central processing unit (CPU) in a single server) may involve a plurality of computing devices (for instance, multiple processors in a load-balanced server farm). Similarly, memory components at different locations may store different portions of instructions 232 and collectively form a medium for storing the instructions. In some examples, client 260 may function as a thin client wherein server 210 performs all or nearly all operations that are not directly related to receiving and providing information to users via user input component 266 and display device 265. Various operations described herein as being performed by a computing device may be performed by a virtual computing device. By way of example, instructions 232 may be specific to a first type of server, but the relevant operations may be performed by a second type of server running a hypervisor that emulates the first type of server. The operations may also be performed by a container, for instance, a computing environment that does not rely on an operating system tied to specific types of hardware.

Example Methods

Further to example systems described above, example methods are now described. Such methods may be performed using the systems described above, modifications thereof, or any of a variety of systems having different configurations. It should be understood that the operations involved in the following methods need not be performed in the precise order described. Rather, various operations may be handled in a different order or simultaneously, and operations may be added or omitted.

Figure 3:
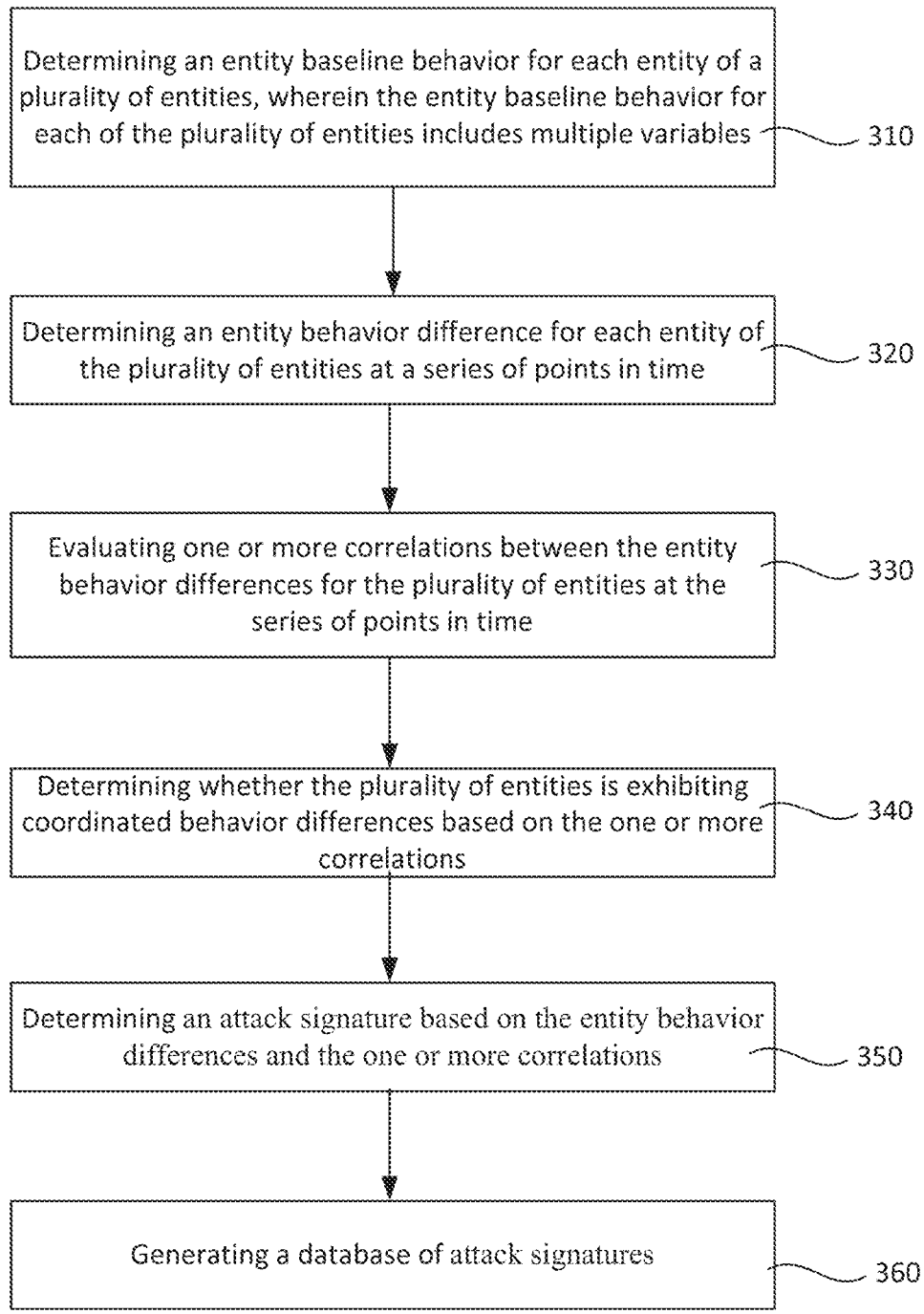
FIG. 3 is a flow diagram according to aspects of the disclosure.

FIG. 3 provides an example flow diagram 300 for detecting zero-day attacks. FIGS. 4A-5B illustrate example baseline behaviors, behavior differences, anomaly scores, and correlations. The example features of flow diagram 300 can be performed on one or more computing devices, for example, on one or more of the computing devices such as servers 140, 150, and 160 of FIG. 1.

Referring to FIG. 3, blocks 310 and 320 are example features of a first module that makes various individualized determinations. In block 310, an entity baseline behavior is determined for each entity of a plurality of entities, wherein the entity baseline behavior for each of the plurality of entities includes multiple variables. In block 320, an entity behavior difference is determined for each entity of the plurality of entities at a series of points in time. These individualized determinations, which measures behavior differences against individual baseline behaviors, reduce the false positives that might have been produced when behavior differences are measured against some average group baseline behavior.

Figure 4A:
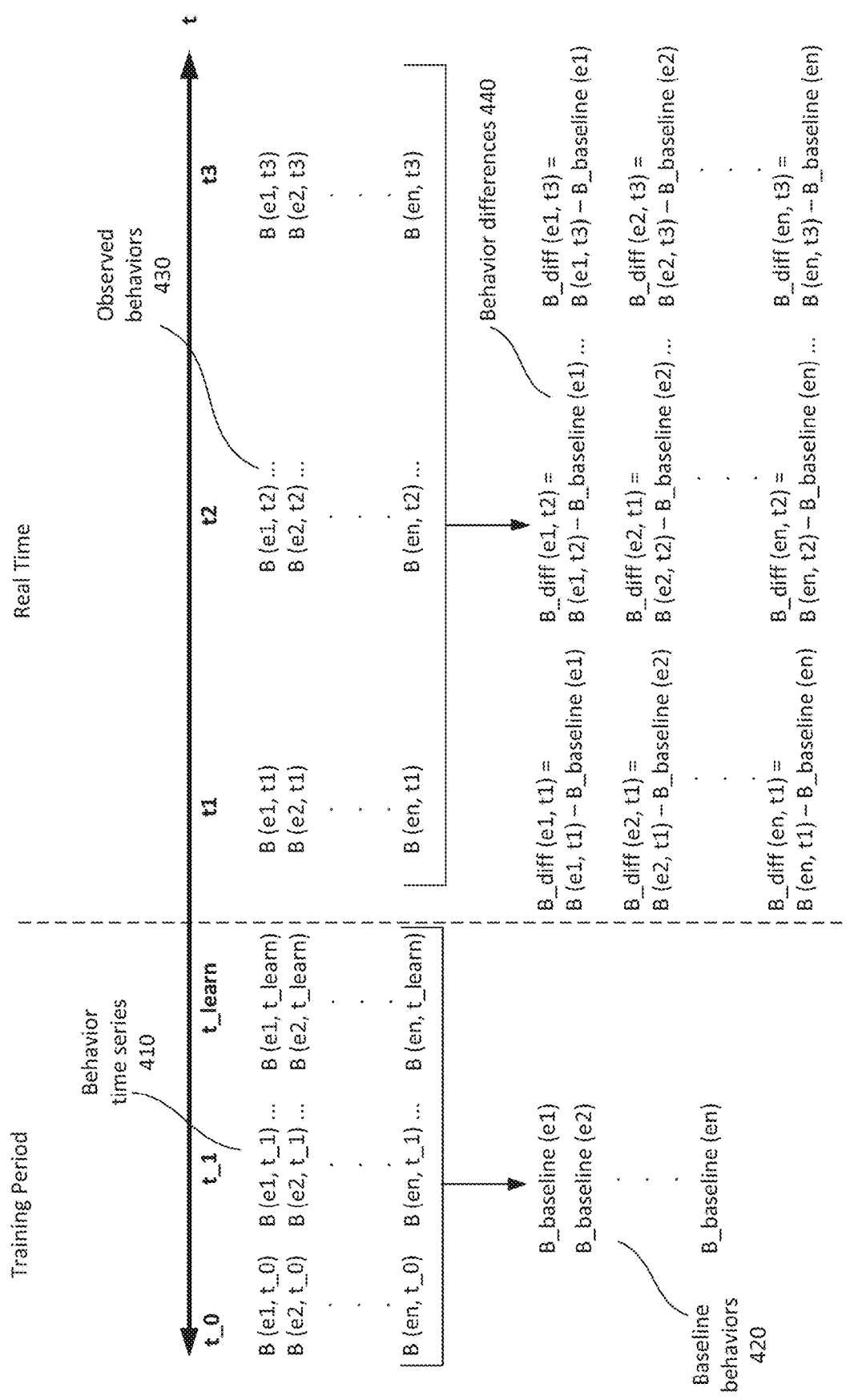
FIG. 4A illustrates example baseline behaviors and behavior differences according to aspects of the disclosure.

FIG. 4A shows simplified pictorial representations 400A of example baseline behaviors and behavior differences. FIG. 4A shows a plurality of entities e1, e2, ..., en, where n is the total number of entities. The plurality of entities e1, e2, ..., en may be members of a predetermined group that are likely to be targeted by attackers in a coordinated fashion. For example, the entities may be mobile devices of a particular brand/model, virtual machines belonging to a particular service, cloud resources belonging to a particular cloud service, users of a particular online service, users of a particular API, etc. When the predetermined group is under attack, members of the predetermined group may be expected to exhibit similar abnormal behaviors. For instance, without being attacked, observed behavior of an entity e at a given time t may be expressed as $B(e,t\_nottack)=B\_baseline(e)+Benign\_Fluctuation(e)$. After the entity is attacked with an unknown attack signature B_attacksig, observed behavior of the entity may be expressed as $B(e,t\_afterattack)=B\_baseline(e)+Benign\_Fluctuation(e)+B\_attacksig$. Thus, to determine the unknown attack signature B_attacksig, the baseline behavior B_baseline(e) of the entity is determined.

In this regard, the left hand side of FIG. 4A illustrates how entity baseline behaviors B_baseline(e) 420 are determined for the plurality of entities e1, e2, ..., en in the predetermined group. As shown, the entity baseline behavior B_baseline(e) 420 for an entity may be determined based on a past behavior time series 410 of various behavioral features of the entity. For example, $B(e1, t\_0)$, $B(e1, t\_1)$, $B(e1, t\_learn)$ are behavior snapshots in a behavior time series for entity e1 during a training period from t_0 to t_learn, and $B(e2, t\_0)$, $B(e2, t\_1)$, $B(e2, t\_learn)$ are behavior snapshots in a behavior time series for entity e2 during the training period from t_0 to t_learn, etc.

Each behavior snapshot in the behavior time series 410 may include multiple behavioral features or variables about the entity. For example, when the entities are users of an application, behavior features or variables indicative of unauthorized activity may include various API methods such as drive.files.get, messages.send, contacts.get, etc., where values of the features/variables may be the number of times such methods are called. For another example, when the entities are virtual machines, behavior features or variables indicative of data-exfiltration may include egress IPs used by the virtual machines, where values of the features/variables may be the amount of egress data traffic. As such, the behavior snapshot $B(e1, t\_0)$ may include snapshot values for multiple behavior features/variables $[x1(e1, t\_0), x1(e1, t\_0), ..., xm(e1, t\_0)]$.

Using these behavior time series 410, entity baseline behaviors B_baseline(e) 420 are determined for each entity in the predetermined group. For example, B_baseline(e1) is determined based on the behavior time series $B(e1, t\_0)$, $B(e1, t\_1)$, $B(e1, t\_learn)$, and B_baseline(e2) is determined based on the behavior time series $B(e2, t\_0)$, $B(e2, t\_1)$, $B(e2, t\_learn)$, etc. As with the behavior time series 410, each baseline behavior B_baseline(e) may include baseline values for multiple behavioral features or variables about the entity e. For example, the baseline behavior B(e1) may include baseline values for multiple behavior features/variables $[x1(e1, baseline), x1(e1, baseline), ..., xm(e1, baseline)]$.

Any of a variety types of machine learning techniques may be used to determine the entity baseline behaviors B_baseline(e) 420 based on the behavior time series 410, for example, a Moving Average model, an Autoregressive Integrated Moving Average (ARIMA) model, a regression model, a classification model, a linear model, a boosting tree model, a random forest model, a neural net model, or a long short-term memory (LSTM) model. For instance, a Moving Average model takes an average of each behavior feature over a recent past period, and computes a 3-sigma standard-deviation envelope on the variation of each behavior feature as the baseline values. For another instance, an LSTM model is trained based on a time series of values of behavior features over a past period, and the LSTM model predicts current values of these behavior features, which are used as the baseline values.

The right hand side of FIG. 4A shows events in real time. As shown, entity behaviors 430 for each entity in the predetermined group are observed at a series of time points t1, t2, and t3. For example, B(e1, t1) is the observed behavior of entity e1 at time t1, and B(e2, t2) is the observed behavior of entity e2 at time t2, etc. For instance, the series of time points may be spaced by regular intervals (such as every second, every minute, etc.). These observed entity behaviors B(e,t) 430 may be the same or different from the respective entity baseline behaviors B_baseline(e) 420. As described above, since the entity behavior differences over the entity baseline behaviors may include the unknown attack signature B_attacksig, in order to determine B_attacksig, the entity behavior differences over entity baseline behaviors are determined.

In this regard, the right hand side of FIG. 4A illustrates how entity behavior differences B_diff(e,t) 440 are determined at each time point for the entities in the predetermined group. The entity behavior differences B_diff(e,t) 440 are determined by comparing the entity's observed behavior B(e,t) 430 with the entity's baseline behavior B_baseline(e) 420. For instance, the entity behavior difference may be computed as the difference between the entity's observed behavior and baseline behavior B_diff(e,t)=B(e,t)−B_baseline(e,t). As shown, the entity behavior difference for entity e1 at time t1 is B_diff (e1, t1)=B (e1, t1)−B_baseline (e1), and the entity behavior difference for entity e2 at time t3 is B_diff (e2, t3)=B (e2, t3)−B_baseline (e2), etc. As with the time series 410 and the baseline behaviors 420, each entity behavior difference B_diff(e,t) may include difference values for multiple behavioral features or variables as compared to the entity baseline behavior. For example, the behavior difference B_diff (e1, t1) may include difference values for multiple behavior features/variables [x1(e1, t1)−x1(e1, baseline), x1(e1, t1)−x1(e1, baseline), . . . , xm (e1, t1)−xm (e1, baseline)].

For some behavioral features or variables, the difference values may be positive, for others, the difference values may be negative. Positive difference values in the behavior difference B_diff(e,t) represent extra activities that the entity is doing at time t that is not present in its baseline behavior B_baseline(e), in contrast, negative difference values in the behavior difference B_diff(e,t) represent activities that the entity is omitting when the snapshot was taken at time t. While extra activities conducted by an entity might be caused by an attack, activities that are omitted at a particular time are not likely to be caused by an attack (e.g., the entity might have already done the omitted activity at the previous time point). Thus, in further computations, the method may keep only the positive difference values in the entity behavior differences and discard the negative difference values. This way, fewer computations may be required (fewer values), and false positives (based on omitted activities) may be reduced.

Although not shown in FIG. 3, an anomaly score may be determined at each time point for each entity in the predetermined group along with the entity behavior differences. FIG. 4B shows simplified pictorial representations 400B of how anomaly scores A(e,t) 450 are computed for each entity at the time point t1. For example, A(e1, t1) is the anomaly score for entity e1 at time t1, and A(e2, t1) is the anomaly score for entity e2 at time t1, etc. Although only computations at t1 are shown for ease of illustration, the same computations may be performed at each time point. The anomaly score for an entity e at a time t represents the inverse of the probability of the entity's observed entity behavior at time t given the entity's baseline behavior A(e,t)=1/P(B(e,t)|B_baseline(e)). Thus, the lower the probability that the observed entity behavior would occur given the baseline behavior, the higher the anomaly score.

The anomaly scores A(e, t) 450 may be determined in a number of ways. For example, the anomaly scores A(e, t) 450 may be computed using a predetermined divergence function. The predetermined divergence function may be any type of divergence function, such as a chi-square histogram divergence function. Other examples of divergence functions include similarity-metric functions using standard similarity metrics, such as Cosine-similarity or Jaccard-similarity. In some examples, the anomaly score of an entity is determined using all the observed behavioral features. In this regard, the anomaly score may be computed by finding the point of minimum divergence of the entity's currently observed behavior compared to its behaviors in the past: A(e,t)=min over h {divergence(B(e,t), B(e,t−h))}, where h=[1 . . . H] is the set of look-back time points in the past. In other examples, the anomaly score of an entity is determined using deep learning techniques. For example, the observed behavioral features of the entity are first transformed to minimize a loss function of an LSTM or autoencoder model in order to select the behavioral features that should be considered. Next, predictions are made on these selected behavioral features for the entity at future time points. The anomaly score is then determined by finding the divergence between the predicted current behavior at time t and the observed current behavior A(e,t)=divergence(B(e,t), Predicted_B(e,t)).

As described above with respect to entity baseline behaviors, any of a variety types of machine learning techniques may be used to determine the anomaly score. For instance, using a Moving Average model, an average of each behavior feature over a recent past period may be computed, and a 3-sigma standard-deviation envelope on the variation of each behavior feature may be computed and used to predict behavior values at time t. These predicted behavior values may then be compared with the observed behavior values for computation of anomaly score at time t. For another instance, an LSTM model may be trained using a time series of values of behavior features in a past period, this LSTM model may be used to predict values of these behavior features at time t. These predicted behavior values may then be compared with the observed behavior values for computation of anomaly score at time t.

The anomaly scores 450 may be used in a number of ways. For example, the correlations described in detail below may be performed only for entity behavior differences whose corresponding anomaly scores are above a predetermined anomaly threshold. This way, false positives may be reduced since only significant behavior differences are correlated. For another example, if an anomaly score of an entity is higher than the predetermined anomaly threshold, an alert may be generated.

As described above, the existence of an entity behavior difference does not necessarily indicate that an entity is under attack. For example, even without an attack, a behavior difference may result from changes voluntarily made by a user, which as discussed above may be expressed as B_diff(e,t)=B_baseline(e)+Benign_Fluctuation(e). To distinguish these benign behavior differences from the behavior differences that were caused by an attack (as described above may be expressed as B_diff(e,t)=B_baseline(e)+Benign_Fluctuation(e)+B_attacksig), correlations may be performed on the entity behavior differences.

In this regard, referring back to FIG. 3, blocks 330 and 340 are example features of a second module that makes various aggregated determinations. In block 330, one or more correlations between the entity behavior differences for the plurality of entities are evaluated at the series of points in time. In block 340, it is determined whether the plurality of entities is exhibiting coordinated behavior differences based on the one or more correlations. These aggregated determinations, which analyze whether the predetermined group exhibits coordinated behavior differences, reduce the false positives that might have been produced when isolated entities dramatically change their behaviors. Further, producing alerts at the aggregated level of the second module offers greater privacy protection to individual entities. For example, rather than producing alerts that report particular users' abnormal activities, alerts may be produced only to report that coordinated behavior differences are exhibited by multiple entities in the predetermined group.

Figure 5A:
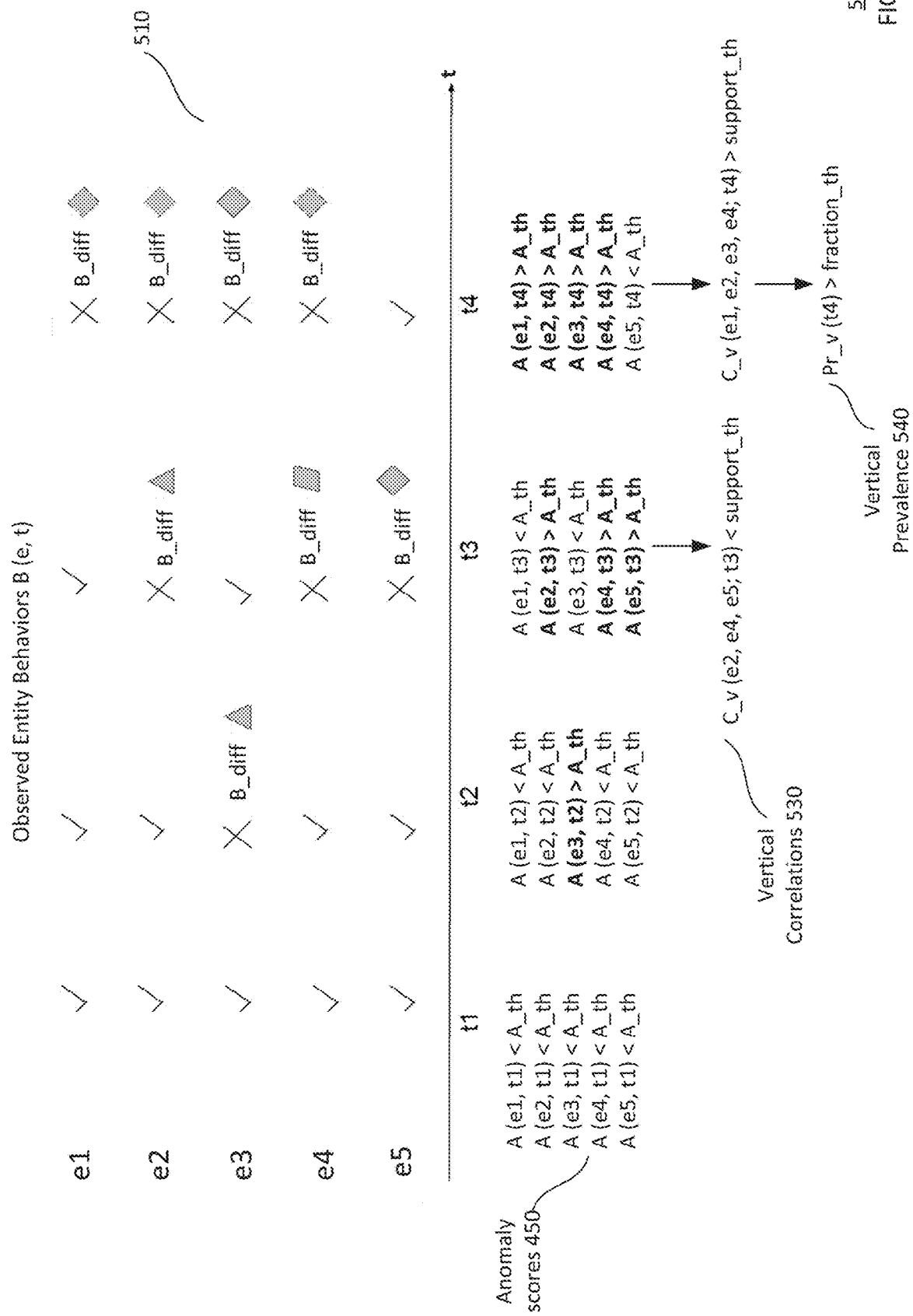

FIGS. 5A and 5B show example correlations of behavior differences according to aspects of the disclosure. In FIG. 5A, the simplified pictorial representation 500A shows how the entity behavior differences may be correlated between multiple entities in the predetermined group at a same point in time ("vertical correlation") to determine whether the predetermined group is under attack at that point in time. In FIG. 5B, the simplified pictorial representation 500B shows how the entity behavior differences may be correlated between multiple entities in the predetermined group across multiple points in time ("horizontal correlation") to determine whether an attack is or has been underway for the predetermined group. Although FIGS. 5A and 5B show examples where either vertical correlations or horizontal correlations are used, other examples may use both vertical correlations and horizontal correlations.

Referring to FIG. 5A, for ease of illustration, the timeline 510 shows the observed behaviors for a predetermined group of five entities e1, e2, e3, e4, and e5 at a series of time points t1, t2, t3, and t4. The observed behaviors are either shown as check marks or crosses. A check mark indicates that the observed behavior is not significantly different from the baseline behavior of the entity, while a cross indicates that the observed behavior is significantly different from the baseline behavior of the entity. In this regard, as shown in FIG. 5A, a predetermined anomaly threshold A_th may be set such that, if the anomaly score A(e, t) for an entity e at time t is above A_th, then the observed behavior B(e,t) of the entity at time t is considered to be significantly different compared to the baseline behavior B_baseline(e,t), which indicates that the entity behavior difference B_diff (e,t) at time t is significant; otherwise, the observed behavior B_(e, t) of the entity is considered to be not significantly different compared to the baseline behavior B_baseline(e,t), which indicates that the entity behavior difference B_diff (e,t) at time t is not significant. Thus, at t1, the check marks indicate that the observed behavior B(e, t) for each of the five entities are not significantly different compared to the respective baseline behavior B_baseline(e); while at t2, t3, and t4, the crosses indicate that the observed behavior B(e, t) for some of the five entities are significantly different compared to their respective baseline behaviors B_baseline(e).

The predetermined anomaly threshold A_th may be adjusted. For example, if A_th=0, then any behavior difference, no matter how small, would be considered significant compared to the baseline behavior, analyzing all such behavior differences may require a large amount of computations and produce a large amount of false positives. For another example, if A_th is set too high, then many behavior differences may be overlooked, resulting in failures to detect certain attacks. For instance, where anomaly scores A_th are used to generate alerts, A_th may be set based on the number of alerts that can be manually reviewed in a reasonable time. For example, P(B(e,t)/B_baseline(e)<0.1 or A_th=10 may be a reasonable value for A_th.

Once significant behavior differences are identified based on anomaly scores 450, vertical correlations 530 may be computed for the entities in the predetermined group at each time point. As shown, at time t1, because none of the entities e1-e5 exhibited significant behavior differences from their respective baseline behaviors (anomaly scores all below the anomaly threshold A_th), no vertical correlation exists at t1. The lack of vertical correlation (due to the lack of significant behavior differences) indicates that the predetermined group is not under attack at t1. At t2, although one of the entities e3 is observed to exhibit a significant behavior difference from its baseline behavior (anomaly score for e3 is above the anomaly threshold A_th), since no significant behavior differences are observed for any other entity in the predetermined group at t2, no vertical correlation exists at t2. This lack of vertical correlation indicates that the predetermined group is also not under attack at t2.

At t3, significant behavior differences are observed for multiple entities e2, e4, and e5, since the anomaly scores for e2, e4, and e5 are above the anomaly threshold A_th. However, vertical correlation C_v(t3) of the behavior differences for e2, e4, and e5 (shown as different shapes) is low, indicating that the behavior differences are not sufficiently similar at t3. As discussed above, the method may use only the positive difference values in the entity behavior differences for computing the vertical correlation.

The vertical correlations 530 may be computed using any type of similarity metrics. In some examples, the vertical correlations 530 may be computed pair-wise using cosine-similarity or Jaccard-similarity metrics. For instance, for the set of significant behavior differences at t3, B_diff(e2,t3), B_diff(e4,t3), B_diff(e5,t3), comparisons are made in pairs, e.g., B_diff(e2,t3) v. B_diff(e4,t3), B_diff(e2,t3) v. B_diff (e5,t3), B_diff(e4,t3) v. B_diff(e5,t3), using cosine- or Jaccard-similarity functions. Then, the size of the largest subset of mutually similar behavior differences is compared with the size of the set of all the significant behavior differences. In this regard, a support threshold, support_th, may be set such that, if the size of the largest subset of mutually similar significant behavior differences compared to the size of the set of all the significant behavior differences is above the support threshold, the significant behavior differences are considered to be sufficiently similar, otherwise, the significant behavior differences are considered to be not sufficiently similar. For instance, at t3, because none of the set of 3 entities exhibiting significant behavior differences are mutually similar, the size of the largest subset of mutually significant behavior differences is 0, if support_th is set as 0.75, then 0/3 is smaller than the support threshold support_th. Thus, the vertical correlation C_v(t3) is below the support threshold support_th. This low vertical correlation C_v(t3) indicates that the predetermined group is not under attack at t3.

In other examples, the vertical correlations 530 may be computed group-wise using a frequent-item-set mining technique. For instance, for the set of significant behavior differences at t3 B_diff(e2,t3), B_diff(e4,t3), B_diff(e5,t3), a common set of positive behavior features (or "frequent patterns") is extracted from these significant behavior differences. In this regard, a support threshold, support_th, may be set such that, if the common set of behavior features are present in more than the support threshold of significant behavior differences, the significant behavior differences are considered to be sufficiently similar, otherwise, the significant behavior differences are considered to be not sufficiently similar. For instance, at t3, because 0/3 of the significant behavior differences share a common set of behavior features, the vertical correlation C_v(t3) is below the support threshold support_th. This low vertical correlation C_v(t3) indicates that the predetermined group is not under attack at t3.

Finally at t4, significant behavior differences are observed for multiple entities e1, e2, e3, and e4, since the anomaly scores for e1, e2, e3, and e4 are above the anomaly threshold A_th. This time, the vertical correlation C_v(t4) of the behavior differences for e1, e2, e3, and e4 (shown as same shapes) is high, indicating that the behavior differences are sufficiently similar with minor differences (shown as different borders). That is, since the vertical correlation C_v(t4) is above the support threshold support_th, the vertical correlation C_v(t4) indicates that the predetermined group may be under attack at t4.

However, even if two or more entities have behavior differences that are sufficiently similar, it may not be evident of an attack of the predetermined group if they account for a very small fraction of the predetermined group. For example, the small fraction of entities may happen to make similar changes in behavior, or the small fraction of entities may happen to be broken devices, etc. In this regard, a predetermined threshold fraction, fraction_th, may be set such that, if a prevalence of sufficiently similar behavior differences is above the predetermined threshold fraction at a point in time ("vertical prevalence"), the predetermined group is determined to be under attack, otherwise, the predetermined group is determined to be not under attack. For example, the predetermined threshold fraction may be 70%. As shown, since the vertical prevalence 540 at t4 Pr_v(t4) is 4/5 or 80%, which is greater than the predetermined threshold fraction, fraction_th, this indicates that the predetermined group is under attack at t4. Although for illustration purposes, a high value of 70% is chosen for the predetermined threshold fraction, in other examples a much lower value may be chosen. For example, 25% of the predetermined group exhibiting sufficiently similar significant behavior differences may already be indicative of an attack.

Also for ease of illustration, the time granularity for collecting observed entity behaviors and computing behavior differences/anomaly scores is shown to be the same as the time granularity for correlating the significant behavior differences. In other examples, while the observed entity behavior, entity behavior difference, and anomaly score may be determined at one time granularity, such as hourly, the correlations may be computed at another time granularity, such as daily. Further, the predetermined threshold fraction may be set based on the difference in the two granularities (for example, if correlations are computed less frequently than entity behavior differences, a higher threshold fraction may be set than if the correlations are calculated at the same frequency as entity behavior differences).

Referring to FIG. 5B, for ease of illustration, the timeline 512 shows observed behaviors of a predetermined group having five entities e1, e2, e3, e4, and e5 at a series of time points t1, t2, t3, t4, and t5. FIG. 5B shows many similar features as FIG. 5A, for instance, anomaly scores 450 are used to identify significant behavior differences. However, horizontal correlations 532 and horizontal prevalence 542 are determined in this example—significant behavior differences are correlated across multiple points in time and sufficiently similar behavior differences are also tallied across multiple points in time. Such horizontal analyses are important because a more sophisticated attacker may intentionally spread out the attacks in time, causing abnormal activities in only a small number of entities at each snapshot in time. Such sophisticated attacks more difficult to detect when snapshots are analyzed individually, and therefore may require horizontal correlations to be computed.

As shown in the timeline 512, at time t1, since the anomaly scores for all five entities are below the anomaly threshold, observed behaviors of all five entities are shown as check marks. Further, since none of the entities e1-e5 exhibited significant behavior differences from their respective baseline behaviors at t1, and t1 is the starting time point, no horizontal correlation exists at t1. The lack of horizontal correlation (due to the lack of significant behavior differences so far) indicates that the predetermined group is not under attack at t1.

At t2, the anomaly score for only one of the entities e2 is above the anomaly threshold (shown as a cross), which means that entity e2 exhibits a significant behavior difference from its baseline behavior (shown as a rhombus). However, since no significant behavior differences are observed for any other entity in the predetermined group at t2 or t1, no horizontal correlation exists at t2. This lack of horizontal correlation (due to the lack of other significant behavior differences so far) indicates that the predetermined group is also not under attack at t2.

At t3, the anomaly score for only one of the entities e4 is above the anomaly threshold (shown as a cross), which means that entity e4 exhibits a significant behavior difference from its baseline behavior (shown as a rhombus). Since there had been one other significant behavior difference observed at t2 for entity e2, horizontal correlation C_h (t2-t3) may be determined between the two significant behavior differences. The horizontal correlations, like the vertical correlations, may be computed using any type of similarity metrics, such as pair-wise comparisons using cosine-similarity or Jaccard-similarity, or group-wise comparisons using frequent-item-set mining. As shown, since the horizontal correlation C_h (t2-t3) has a value above the support threshold support_th, which indicates that the two significant behavior differences observed so far are sufficiently similar (shown as same shape with different borders). Next, horizontal prevalence Pr_h (t2-t3) of the sufficiently similar behavior differences are determined by finding the total number of sufficiently similar behavior differences observed so far as a fraction of the predetermined group, which at t3 is 2/5. Because the horizontal prevalence Pr_h (t2-t3) is below the predetermined threshold fraction of 70%, this indicates that an attack has not occurred at t3.

At t4, the anomaly score for only one of the entities e5 is above the anomaly threshold (shown as a cross), which means that entity e5 exhibits a significant behavior difference from its baseline behavior (shown as a rhombus). Since there had already been two significant behavior differences observed at t2 and t3 for entities e2 and e4, horizontal correlation C_h (t2-t4) may be determined for all three significant behavior differences. As shown, the horizontal correlation C_h (t2-t4) has a value above the support threshold support_th, which indicates that the three significant behavior differences observed so far are sufficiently similar (shown as same shape with different borders). Next, horizontal prevalence Pr_h (t2-t4) of the sufficiently similar behavior differences observed so far are determined, which at t4 is 3/5. Because the horizontal prevalence Pr_h (t2-t4) is still below the predetermined threshold fraction of 70%, this indicates that an attack has not occurred at t4.

Finally at t5, again the anomaly score for only one of the entities e1 is above the anomaly threshold (shown as a cross), which means that entity e1 exhibits a significant behavior difference from its baseline behavior (shown as a rhombus). At this point, because there had already been three significant behavior differences observed at t2, t3, and t4 for entities e2, e4 and e5, horizontal correlation C_h (t2-t5) may be determined for all four significant behavior differences. As shown, the horizontal correlation C_h (t2-t5) now has a value above the support threshold support_th, which indicates that the four significant behavior differences observed are all sufficiently similar (shown as same shape with different borders). Next, horizontal prevalence Pr_h (t2-t5) of sufficiently similar behavior differences observed so far are determined, which at t5 is 4/5. Thus, at t5 the horizontal prevalence Pr_h (t2-t5) is above the predetermined threshold fraction of 70%, this indicates that the predetermined group is under attack.

Referring back to FIG. 3, in block 350, an attack signature is determined based on the entity behavior difference and the one or more correlations. An attack signature may be determined based on the entity behavior differences and the correlations. For instance, recall that, after an entity is attacked, its observed behavior may be expressed as B(e, t_afterattack)=B_baseline(e)+Benign_Fluctuation(e)+B_attacksig. In this regard, significant behavior differences that are highly correlated and sufficiently prevalent in a predetermined group are likely to include the attack signature. For example, referring to FIG. 5A, at t4, four entities, e1, e2, e3, and e4, in the predetermined group are observed to exhibit significant behavior differences B_diff(e1,t4), B_diff(e2,t4), B_diff(e3,t4), and B_diff(e4,t4) (shown as crosses) that are sufficiently similar (shown as same shape with different borders) and sufficiently prevalent (80%). For entity e1, the significant behavior difference at t4 can be expressed as B_diff(e1,t4)=B(e1,t4)−B_baseline(e1)=Benign_Fluctuation(e1)+B_attacksig. Likewise, for the other entities, B_diff(e2,t4)=Benign_Fluctuation(e2)+B_attacksig, B_diff(e3,t4)=Benign_Fluctuation(e3)+B_attacksig, and B_diff(e4,t4)=Benign_Fluctuation(e4)+B_attacksig. Thus, B_attacksig may be determined by identifying the common behavioral features/variables across the difference vectors B_diff(e1,t4), B_diff(e2,t4), B_diff(e3,t4), B_diff(e4,t4). For example, the frequent-item-set mining techniques described above may be used in computing attack signatures.

In block 360, a database of attack signatures is generated. In this regard, the attack signature of the previously unknown attack (determined as described above) may be used to build a database of attack signatures. Such a database may be used for quick detection of future attacks. For example, entity behaviors may be monitored to see whether their behavior differences B_diff(e,t) include any of the attack signatures in the database to quickly detect an attack, without the need for the various computations described above. For another example, entity behavior differences B_diff(e,t) that exhibit high similarities with the attack signatures in the database may be flagged for further analyses. For yet another example, alerts may be generated when the entity behaviors are observed to include the attack signatures in the database or include behavioral features that are highly similar but not identical to the attack signatures in the database.

Further analyses may be performed to classify whether each attack signature in the database is that of a true attack or a false positive. For example, the analyses may be performed by human analysts. The classification, whenever available, may be included in the database along with the attack signatures. This way, when a new attack signature is determined for a current attack, the new attack signature may be compared to the attack signatures in the database. If a match is found in the database, it may be quickly determined whether the current attack is a true attack or a false-positive. If no match is found in the database, manual review may be required to determine whether the current attack is a true attack or a false-positive.

Still further, over time, as more zero-day attacks with unknown signatures are detected and as their attack signatures are subsequently determined and classified as described above, the database may be used to fine-tune the example methods described above. For instance, the attack signatures in the database may indicate that certain behavioral features/variables are more prevalent in attack signatures than others, therefore such behavioral features/variables should be given more weight in the computations described above. For example, the divergence function for determining anomaly scores may be customized to include only the behavioral features/variables that are prevalent in the database. For another example, vertical and horizontal correlations between the entity behavior differences may be weighted for each behavioral feature/variable according to its prevalence in the database.

Although not shown, each of the entities in the examples above may also belong to multiple predetermined groups. For example, a user may subscribe to multiple services of an online service provider, each service that the user is subscribed to may be a predetermined group that an attacker may target. For another example, a virtual machine may have multiple software installed, each software may be a predetermined group that an attacker may target. While in some cases, it may only be possible to monitor the entity's entire behavior, in other cases it may be possible to separately monitor the observed behaviors of the entity by the predetermined group.

Figure 6:
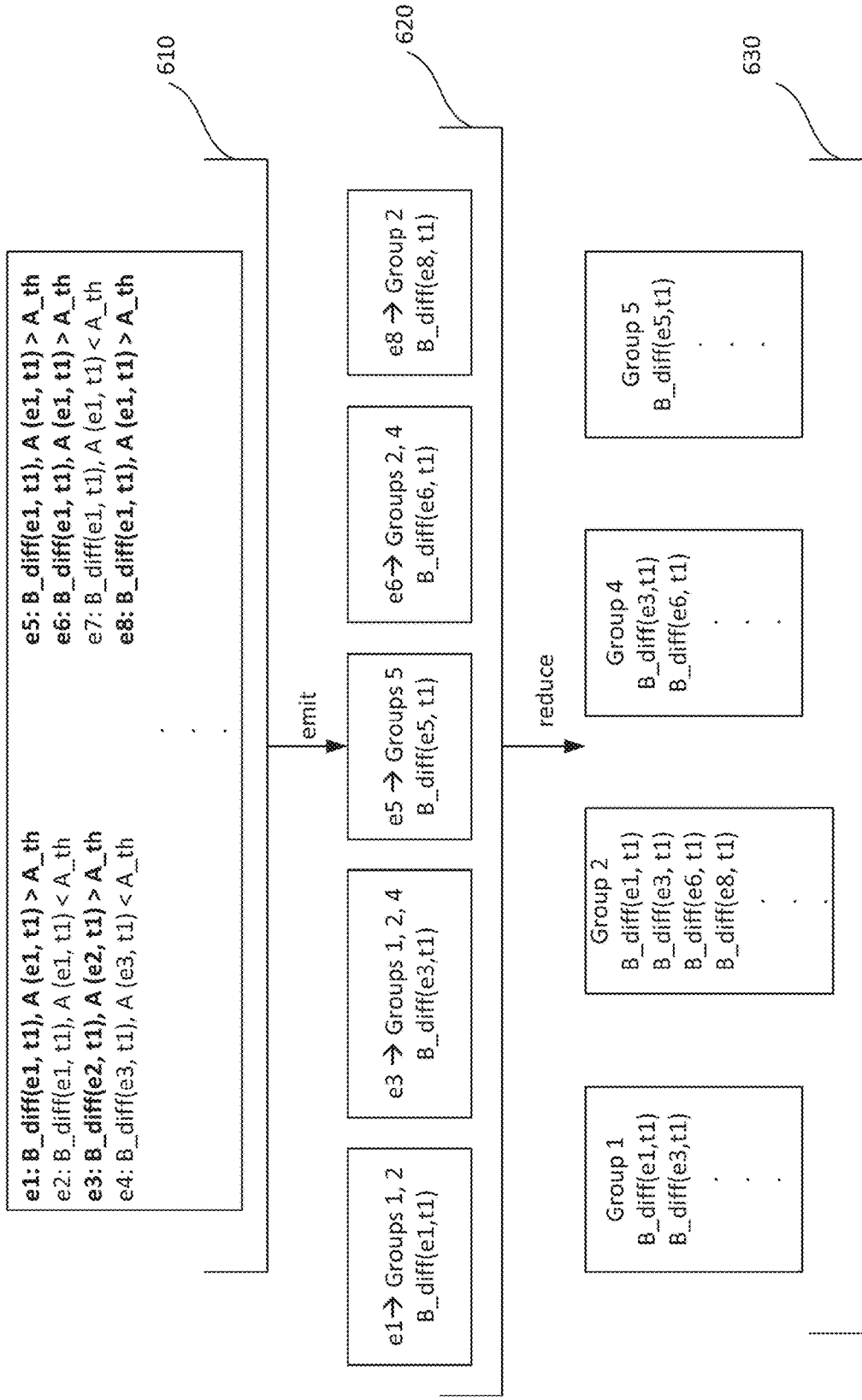
FIG. 6 is a block diagram illustrating an example model for handling and analyzing behavioral data on a distributed system according to aspects of the disclosure.

In this regard, to implement features of the examples described above with respect to FIGS. 3-5B for entities belonging to multiple predetermined groups, "split-apply-combine" programming models such as MapReduce may be used for data analyses. FIG. 6 shows a pictorial representation 600 of an example MapReduce implementation. The example features of FIG. 6 may be implemented using a distributed system of computing devices, for example such as the distributed system in FIG. 1. The flow of data are shown from top to bottom for a single time point t1.

Starting from the top, raw data 610 include behavior differences and anomaly scores computed for various entities in various predetermined groups at t1, and the significant behavior differences are identified (based on anomaly score above the anomaly threshold). For example, computing devices such as servers 140, 150, and 160 may each receive some observed behavior data from computing devices such as clients 110 and 120 shown in FIG. 1, and may, based on the received behavior data, compute the entity baseline behaviors, entity behavior differences, and anomaly scores, and identify the significant behavior differences. These raw data 610 may be stored as shards, such as shards 142, 152, and 162 shown in FIG. 1, where each of the shards 142, 152, and 162 may store behavior data for an arbitrary set of entities. For example server 140 may have computed the behavior differences and anomaly scores for entities 1-3 and stored these values in shard 142, server 150 may have computed the behavior differences and anomaly scores for entities 3-6 and stored these values in shard 152, server 160 may have computed the behavior differences and anomaly scores for entities 7-8 and stored these values in shard 162, etc. As shown, the bolded behavior differences B_diff(e,t) have corresponding anomaly scores A(e,t) above the anomaly threshold A_th.

The significant behavior differences for each entity may be emitted to each predetermined group that the entity belongs, as shown by emitted data blocks 620. For example, computing devices such as servers 140, 150, and 160 shown in FIG. 1 may each emit the significant behavior differences they computed and stored in shards 142, 152, and 162 to each predetermined group that the entity belongs, as shown in the emitted data blocks 620. These emitted significant behavior differences may be stored as shards, such as shards 144, 154, and 164 shown in FIG. 1. For example, server 140 may emit the significant behavior differences for entities 1 and 3 and store them in shard 144, server 150 may emit the significant behavior differences for entities 5 and 6 and store them in shard 154, and server 160 may emit the significant behavior differences for entity 8 and store them in shard 164.

Next, the emitted significant behavior differences in the emitted data blocks 620 are reduced into group data blocks 630, each of which now includes all the significant behavior differences observed in the predetermined group. For example, computing devices such as servers 140, 150, and 160 shown in FIG. 1 may each reduce the significant behavior differences stored on it by the predetermined group. These significant behavior differences, now organized by the predetermined group as illustrated by group data blocks 630, may also be stored as shards, such as shards 146, 156, and 166 shown in FIG. 1. For instance, shard 146 may contain all the significant behavior differences for predetermined group 1, shard 156 may contain all the significant behavior differences for predetermined group 2, and shard 166 may contain all the significant behavior differences for predetermined group 3. Further analyses, such as the correlation and prevalence computations as described above, may be carried out using these group data blocks. For example, computing device such as server 140 shown in FIG. 1 may perform correlation and prevalence computations for predetermined group 1. During the example process illustrated in FIG. 6, the computing devices may distribute and re-distribute the data amongst each other, depending on their capability and availability.

The example features of FIG. 6 are scalable even for massive amounts of data. For instance, when example features of FIG. 6 are implemented for approximately 1,000,000,000 (one billion) entities in approximately 1,000,000 (one million) predetermined groups using 1,000 (one thousand) distributed servers, computations of vertical correlations of hourly behavior data collected over 24 hours (one day) as well as an updated horizontal correlation over the past month takes approximately two hours. This scalability is achieved because correlations are only computed for significant behavior differences (anomaly score above anomaly threshold).

Figure 7:
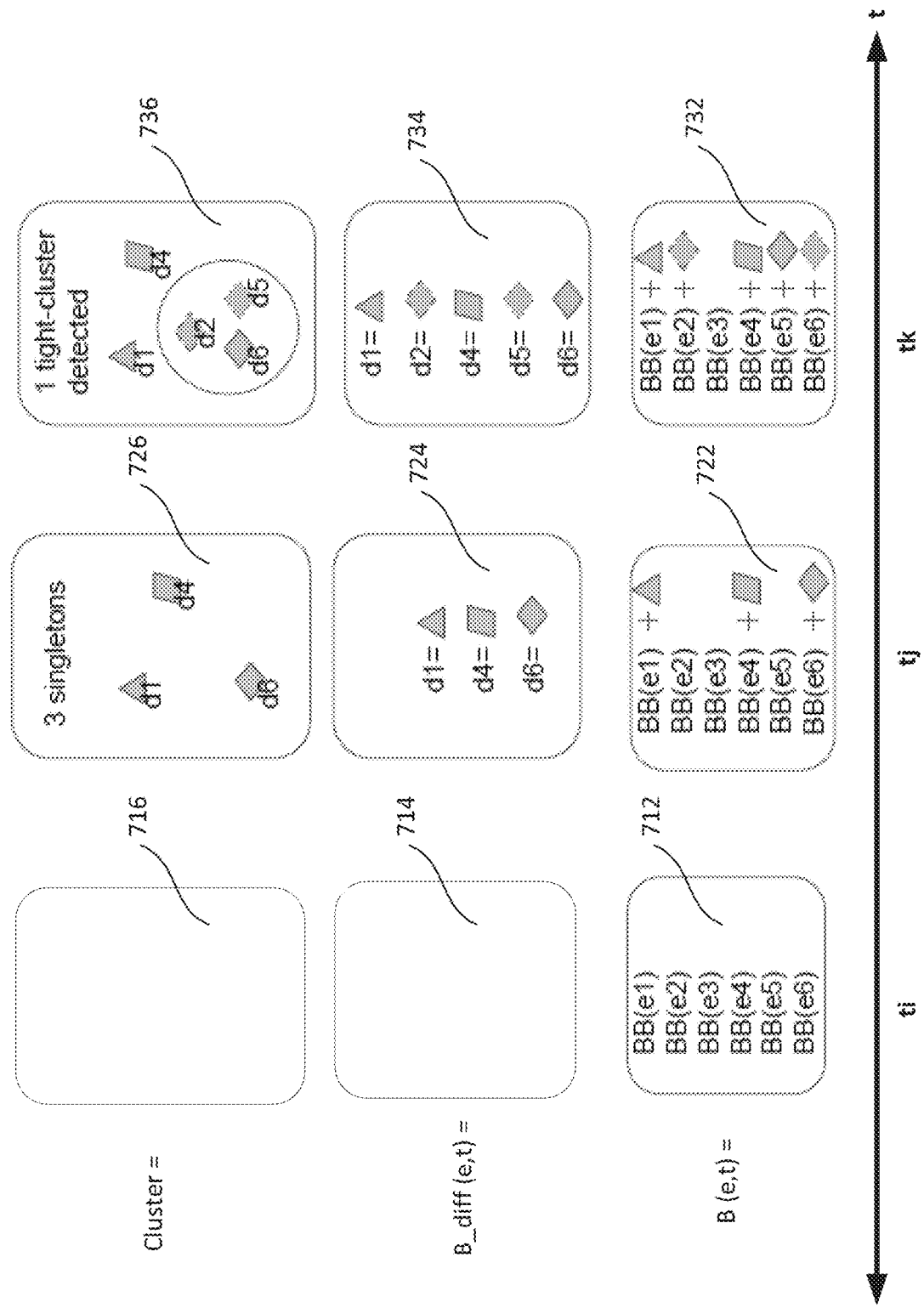
FIG. 7 is illustrates example determinations of clusters of behavior differences according to aspects of the disclosure.

In some circumstances, as shown in FIG. 7, there may not be predetermined groups for the plurality of entities. In such instances, the behavior differences may be correlated between all the entities to identify clusters of entities that may be part of a group targeted for attack. FIG. 7 shows simplified pictorial representations 700 of how clusters may be identified based on correlations of behavior differences. For ease of illustration, FIG. 7 shows sets of observed behaviors 712, 722, 732, sets of significant behavior differences 714, 724, 734, and sets of potential clusters 716, 726, 736 for a total of six entities e1-e6 at three time points ti, tj, and tk.

At time ti, the set of observed behaviors 712 show that all six entities are behaving at or substantially at baseline behavior (abbreviated as "BB(e)"). For example, whether the entities are behaving at or substantially at baseline behavior may be determined based on anomaly scores as discussed above with respect to FIG. 4B. Since there is no significant difference between the observed behavior and the baseline behavior for each of the entities, the set of significant behavior differences 714 is empty. It follows that there is no correlation that can be found to identify any potential clusters, and therefore the set of potential clusters 716 is also empty.

At time tj, the set of observed behaviors 722 for the entities show that some are behaving at baseline behavior, while others show significant behavior difference from the baseline behavior (shown as shapes). The set of significant behavior differences 724 is therefore not empty, where d1 is the behavior difference for e1 at tj, d4 is the behavior difference for e4 at tj, and d6 is the behavior difference for e6 at tj. The set of significant behavior differences 724 are correlated, for example, using the vertical correlation computations as discussed above with respect to FIG. 5A. Because the correlation show that the set of significant behavior differences 724 observed are not sufficiently similar, no potential clusters 726 are identified. Rather, the three significant behavior differences are identified as singletons.

At time tk, the set of observed behaviors 732 show that, one entity is behaving at baseline behavior, while others show significant behavior difference from the baseline behavior (shown as shapes). The set of significant behavior differences 734 is therefore not empty, where d1 is the behavior difference for e1 at tk, d2 is the behavior difference for e2 at tk, d4 is the behavior difference for e4 at tk, d5 is the behavior difference for e5 at tk, and d6 is the behavior difference for e6 at tk. The set of significant behavior differences 734 are correlated, for example, using the vertical correlation computations as discussed above with respect to FIG. 5A. While some significant behavior differences in the set of significant behavior differences 734 observed are sufficiently similar (shown as same shape with different borders), others are not sufficiently similar (shown as different shapes). Thus, a potential cluster 736 is identified including entities e2, e5, and e6 (shown in the circle), while other entities e1 and e4 are identified as singletons. To identify the cluster, a predetermined clustering similarity threshold may be used such that, if the correlation of behavior differences of a set of entities is above the predetermined clustering similarity threshold, a potential cluster is identified including the set of entities, otherwise, the entities are identified as singletons. Entities in the potential cluster may belong to a particular group targeted for attack.

Once a potential cluster is identified as shown in the set of potential clusters 736 at tk, prevalence of the potential cluster may be used to detect whether the cluster is under an attack. Note that, because there is no predetermined group in this example, prevalence cannot be determined based on whether the number of entities exhibiting sufficiently similar significant behavior differences is above a threshold fraction of a predetermined group. Rather, a predetermined threshold number of entities may be set such that, if the number of entities in the identified potential cluster is above the predetermined threshold number, this indicates that the potential cluster is under attack, otherwise, the potential cluster is not considered to be under attack. Although vertical correlations and prevalence are used for this example, other examples may alternatively or additionally use horizontal correlations.

Additionally, once a potential cluster is identified, a potential attack channel may be determined for the potential cluster. Because the potential cluster may merely be a fraction of a larger unknown group that is targeted for attack (for example, others are yet to be attacked), identifying the potential attack channel may help identifying other vulnerable entities. For instance, the potential attack channel may be determined based on a largest common attribute amongst the entities in the potential cluster. For example, the largest common attribute may be the location of the user entities in the cluster, so it may be determined that the attacker is targeting users at that location. For another example, the largest common attribute may be a release year of the entity devices, so it may be determined that the attacker is targeting devices released in that year (maybe having similar vulnerabilities). For still another example, the largest common attribute may be all entities that recently had a particular software patch installed.

In summary, the above-described techniques for detecting zero-day attacks are advantageous because they combine individualized approaches with aggregated approaches to accurately detect zero-day attacks. The individualized approach for determining behavior differences over individualized baseline behaviors reduces false positives, as compared to alternative approaches using some average baseline across all entities. The aggregated approach for correlating behavior differences of multiple entities reduces false positives due to rare individual behaviors. The aggregated approach may include vertical and horizontal correlations to better detect coordinated attacks. These techniques provide for determining attack channels when entities are not known to belong to predetermined groups, which helps in identifying more entities that may be potential targets for an attack. These techniques further provide for determining attack signatures, which can be used to build a database for prevention of future attacks. These techniques also provide for a distributed computing system configured to detect zero-day attacks in a highly scalable fashion. The technology is applicable for many types of entities, for example, user computing devices, virtual machines, cloud service users, online service users, or application programming interface (API) users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method, comprising:
   determining, using one or more processors, an entity baseline behavior for each entity of a plurality of entities, wherein the entity baseline behavior for each of the plurality of entities includes multiple variables;
   determining, using the one or more processors, an entity behavior difference for each entity of the plurality of entities at a series of points in time;
   evaluating, using the one or more processors, one or more correlations between the entity behavior differences for the plurality of entities at the series of points in time;
   determining, using the one or more processors, whether the plurality of entities is exhibiting coordinated behavior differences based on the one or more correlations;
   determining, using the one or more processors, an attack signature based on the entity behavior differences and the one or more correlations;
   determining, using the one or more processors, which entities of the plurality of entities belong to a particular group based on the one or more correlations; and
   determining whether the particular group is exhibiting coordinated behavior differences based on whether a number of entities in the particular group is above a predetermined threshold number; and
   generating, using the one or more processors, a database of attack signatures.

2. The method of claim 1, further comprising:
   determining whether the attack signature is a false positive, wherein each of the attack signatures in the database includes an indication of whether the attack signature is a false positive.

3. The method of claim 1, further comprising:
   computing, using the one or more processors, an entity anomaly score for each entity of the plurality of entities at the series of points in time;
   wherein the one or more correlations are evaluated for entities having entity anomaly scores above a predetermined anomaly threshold and whether the plurality of entities is exhibiting coordinated behavior differences is determined based on the one or more correlations evaluated for the entities having entity anomaly scores above the predetermined anomaly threshold.

4. The method of claim 3, further comprising:
   generating an alert when the entity anomaly score is above the predetermined anomaly threshold.

5. The method of claim 3, wherein the entity anomaly score for each entity is computed based on a divergence value of an observed current behavior of the entity compared to past behaviors of the entity over a past time period.

6. The method of claim 3, wherein the entity anomaly score for each entity is computed based on a divergence value between an observed current behavior of the entity compared to a predicted current behavior of the entity.

7. The method of claim 1, wherein the one or more correlations are vertical correlations evaluated for the plurality of entities at a same point in time of the series of points in time.

8. The method of claim 1, wherein the one or more correlations are horizontal correlations evaluated for the plurality of entities across different points in time of the series of points in time.

9. The method of claim 1, wherein determining whether the plurality of entities is exhibiting coordinated behavior differences is based on whether the one or more correlations are above a predetermined support threshold.

10. The method of claim 1, wherein each of the entities in the plurality of entities belongs to a predetermined group, and determining whether the predetermined group is exhibiting coordinated behavior differences is based on whether the entity behavior differences for a threshold fraction of entities of the predetermined group have correlations above a predetermined support threshold.

11. The method of claim 10, further comprising:
generating, using the one or more processors, an alert when the predetermined group is determined to be exhibiting coordinated behavior differences.

12. The method of claim 1, wherein at least one entity of the plurality of entities belongs to more than one predetermined groups.

13. The method of claim 1, wherein
determining, using the one or more processors, which entities of the plurality of entities belong to a particular group is based on which entities have correlations above a predetermined clustering similarity threshold.

14. The method of claim 13, further comprising:
identifying a largest common attribute amongst the entities in the particular group; and
determining an attack channel of the particular group based on the largest common attribute.

15. The method of claim 1, wherein the entities comprise at least one of: user computing devices, virtual machines, cloud service users, online service users, or application programming interface (API) users.

16. A computing system, comprising:
one or more memories; and
one or more processors configured to:
determine an entity baseline behavior for each entity of a plurality of entities, wherein the entity baseline behavior for each of the plurality of entities includes multiple variables;
determine an entity behavior difference for each entity of the plurality of entities at a series of points in time;
evaluate one or more correlations between the entity behavior differences for the plurality of entities at the series of points in time;
determine whether the plurality of entities is exhibiting coordinated behavior differences based on the one or more correlations;
determine an attack signature based on the entity behavior differences and the one or more correlations;
determine which entities of the plurality of entities belong to a particular group based on the one or more correlations; and
determine whether the particular group is exhibiting coordinated behavior differences based on whether a number of entities in the particular group is above a predetermined threshold number; and
generate a database of attack signatures.

17. The computing system of claim 16, further comprising:
one or more memories in communication with the one or more processors, the one or more memories configured to store the database of attack signatures.

18. The computing system of claim 16, wherein the one or more processors are further configured to:
generate an alert when a predetermined group is determined to be exhibiting coordinated behavior differences, wherein each of the entities in the plurality of entities belongs to the predetermined group, and determining whether the predetermined group is exhibiting coordinated behavior differences is based on whether the entity behavior differences for a threshold fraction of entities of the predetermined group have correlations above a predetermined support threshold.

19. A system, comprising:
a computing device adapted to communicate with a plurality of computing devices in a distributed computing environment, the computing device comprising one or more memories and one or more processors configured to:
receive an entity behavior difference for each entity of a plurality of entities at each point of a series of points in time, wherein one or more of the plurality of entities belong to more than one predetermined groups;
emit, for each entity, the received entity behavior difference for the predetermined groups that the entity belongs to;
reduce the emitted entity behavior differences into sets according to the predetermined group;
evaluate, for each set of entity behavior differences, one or more correlations between the entity behavior differences at the series of points in time;
determine whether any set of entity behavior differences are exhibiting coordinated behavior differences based on the one or more correlations;
determine an attack signature based on the entity behavior differences and the one or more correlations;
determine which entities of the plurality of entities belong to a particular group based on the one or more correlations; and
determine whether the particular group is exhibiting coordinated behavior differences based on whether a number of entities in the particular group is above a predetermined threshold number; and
generate a database of attack signatures.

20. The system of claim 19, the one or more processors further configured to:
compute an entity anomaly score for each entity of the plurality of entities at the series of points in time;
wherein the one or more correlations are evaluated for entities having entity anomaly scores above a predetermined anomaly threshold and whether the plurality of entities is exhibiting coordinated behavior differences is determined based on the one or more correlations evaluated for the entities having entity anomaly scores above the predetermined anomaly threshold.

* * * * *